United States Patent [19]

Namikoshi et al.

[11] 4,311,833

[45] Jan. 19, 1982

[54] PROCESS FOR PREPARING ETHYLCARBOXYMETHYLCELLULOSE

[75] Inventors: Hajime Namikoshi; Kazuo Notsu, both of Himeji, Japan

[73] Assignee: Daicel Chemical Industries Ltd., Sakai, Japan

[21] Appl. No.: 126,032

[22] Filed: Feb. 29, 1980

[30] Foreign Application Priority Data

Mar. 6, 1979 [JP] Japan .................................. 54-26268
Mar. 6, 1979 [JP] Japan .................................. 54-26269

[51] Int. Cl.$^3$ .......................................... C08B 11/193
[52] U.S. Cl. .......................................... 536/90; 536/98
[58] Field of Search ...................................... 536/90, 98

[56] References Cited

U.S. PATENT DOCUMENTS 3,896,108  7/1975  Klug ...................................... 536/90

FOREIGN PATENT DOCUMENTS 1418272  6/1959  Fed. Rep. of Germany ........ 536/90
53-8751  3/1978  Japan .
767923  2/1957  United Kingdom .................. 536/98
778732  7/1957  United Kingdom .

*Primary Examiner*—Paul R. Michl
*Attorney, Agent, or Firm*—Hubbell, Cohen, Stiefel & Gross

[57] ABSTRACT

This invention relates to a process for producing ethylcarboxymethylcellulose 0.4 to 1.2 in D.S. of carboxymethyl and 1.5 to 2.5 in D.S. of ethyoxyl. The compound of the present invention possesses good solubility in organic solvents and is useful as an enteric coating material.

5 Claims, No Drawings

PROCESS FOR PREPARING ETHYLCARBOXYMETHYLCELLULOSE

BACKGROUND OF THE INVENTION

1. Field of the Invention

The present invention relates to a process for preparing ethylcarboxymethylcellulose.

An object of the invention is to provide a novel process for preparing ethylcarboxymethylcellulose on an industrial scale. Another object of the invention is to provide ethylcarboxymethylcelluloses which are novel and possess outstanding properties for use as an enteric coating material.

2. Description of the Prior Art

Ethylcarboxymethylcellulose can be produced by the following three types of processes:
(1) Ethylating carboxymethylcellulose.
(2) Carboxymethylating ethylcellulose.
(3) Reacting two kinds of etherifying agents with cellulose at the same time.

Among these three basic types of processes, the processes described as type (1) are most useful. However, in all of the previously known processes described as type (1), ethylation of materials having a high degree of carboxymethylation (0.5 or higher in the degree of substitution) not possible. This as will be described below. (Throughout the specification, the term "degree of substitution," to be abbreviated as D.S., means the average number of substituents introduced into the molecule per mole of anhydroglucose unit.)

Japanese Patent Publication No. 53-8751 (1978) discloses a process of the type (1), which nevertheless is none other than the combination of a known process for preparing carboxymethylcellulose and a known process for preparing ethylcellulose, namely, a known process for preparing ethylcellulose in which sodium carboxymethylcellulose is used in place of pulp. Thus the disclosed process is not best suited to the production of ethylcarboxymethylcellulose. Stated more specifically, the process of the publication is characterized by the first step of treating a cellulosic material with an alkali hydroxide and monochloroacetic acid or sodium salt thereof to introduce carboxymethyl groups into the molecule of cellulose and the second step of reacting ethyl chloride with the carboxymethylcellulose under a condition in which the reaction mixture has a water to sodium hydroxide ratio of 20:80 to 50:50 by weight in the initial stage of the reaction. The ethylation of cellulose conducted with ethyl chloride under the initial condition of the water to sodium hydroxide ratio of 20:80 to 50:50 is exactly what is disclosed in thejspecification of British Patent No. 778,732, page 2, etc.

However, carboxymethylcellulose, when allowed to stand in the presence of an alkali and water, generally becomes highly viscous and undergoes blocking. This gives rise to difficulties in permitting penetration of ethyl chloride into the carboxymethylcellulose and effecting the desired degree of substitution of ether, with difficulties also encountered in stirring the reaction system. This tendency becomes pronounced especially when the material is not lower than 0.5 in D.S. of carboxymethyl. In fact, it is impossible to practice the prior patent with materials which are 0.6 or higher in D.S. Further the examples of Japanese Patent Publication No. 53-8751 disclose only the cases in which the D.S. of carboxymethyl is up to 0.49.

Meanwhile, U.S Pat. No. 3,896,108 discloses a process for ethylating carboxymethylcellulose in a slurry containing dioxane, but the carboxymethylcelluloses that are shown in examples are limited to those up to 0.4 in D.S. of carboxymethyl.

From the viewpoint of production of enteric preparations, the solubility of ethylcarboxymethyl cellulose in solvents is critical. The medicinal preparations, such as enzyme preparations, which are unstable in the presence of water must be formulated with use of a solution of a coating material in an anhydrous solvent, whereas the solvents usable for the ethylcarboxymethylcellulose prepared by the conventional processes are limited only to special solvent mixtures because of its solubility. As reported by Motoyama of Froint Sangyo Co., Ltd. in "Yakugyo Jiho" dated Feb. 27, 1978 or as disclosed in Japanese Patent Disclosure No. 52-41213 (1977), ethylcarboxymethylcellulose is insoluble in absolute ethanol but is soluble in a mixture of ethanol and 5 to 20% of water. Although Japanese Patent Publication No. 53-8751 states that ethylcarboxymethylcellulose is soluble in toluene-ethanol (80:20), methylene chloride-methanol (50:50) and ethyl cellosolve-acetone (80:20), nothing whatever is mentioned about its solubility in single anhydrous solvents such as methanol, ethanol, acetone, etc.

SUMMARY OF THE INVENTION

The present invention provides ethylcarboxymethylcellulose 0.4 to 1.2 in D.S. of carboxymethyl and 1.5 to 2.5 in D.S. of ethoxyl and having good solubility in organic solvents.

The compound of this invention is believed to be a compound which has never been prepared, in view of its physical properties.

More specifically the present compound is soluble in solvent mixtures, such as those disclosed in Japanese Patent Publication No. 53-8751 and also in single organic solvents, such as methanol, ethanol, acetone, methyl ethyl ketone, methyl acetate, etc.

The present compound is useful as an enteric coating material.

While enteric coating agents should be intraintestinally soluble, the pH of the organs differs from person to person. Accordingly it is desired that such agents be soluble not only at a pH of 7.5 as prescribed in the Japanese Pharmacopeia but also at pH values of above about 5. The compound provided by this invention is soluble at various pH values of at least 5. Further since the compound is soluble in single organic solvents as already mentioned, absolute ethanol, for example, is advantageously usable as a solvent when the compound is used for coating drugs, such as enzymes, which are unstable in water. The coatings obtained with use of organic solvents are not only tough and remain stable against changes but also have various useful properties as enteric coatings.

The compound of this invention is prepared from powdery sodium carboxymethylcellulose 0.4 to 1.2 in degree of substitution of carboxymethyl by
(a) finely dividing the sodium carboxymethyl cellulose to an extent that at least 90 wt. % of the resulting particles pass through a 40-mesh screen,
(b) (i) dispersing the sodium carboxymethyl cellulose in a solvent incapable of mixing with water in a free ratio and subsequently adding to the dispersion a mixture of water and a second solvent miscible with both water and the solvent incapable of mixing with water in a free ratio to adjust the sodium carboxymethylcellulose to water ratio to 75:25 to 50:50 by weight, or (ii) adjusting the water content of the cellulose to a sodium carboxymethylcellulose to water ratio of 75:25 to 50:50 by weight and dispersing the cellulose in a solvent incapable of mixing with water in a free ratio, and (c) subjecting the resulting dispersion to ethylation.

DESCRIPTION OF THE PREFERRED EMBODIMENTS

According to this invention, sodium carboxymethylcelluloses useful as starting materials are those having a degree of substitution of carboxymethyl of at least 0.4, preferably at least 0.5 but up to 1.2. Sodium carboxymethylcelluloses which are above 1.2 in degree of carboxymethyl substitution are not desirable since the ethylcarboxymethylcellulose eventually obtained is likely to dissolve in the gastric juice.

Sodium carboxymethylcelluloses useful in this invention are those commercially available in large quantities. The material is used as finely divided or classified to such an extent that at least 90% of the particles usually pass through a 40-mesh screen (according to JIS). Practically it is preferable to use such particles that about 90% thereof are minus 60 mesh. A useful material can of course be prepared from pulp in the usual manner by carboxymethyletherifying the pulp with monochloroacetic acid or sodium monochloroacetate, drying the resulting sodium carboxymethylcellulose and finely dividing the dried one.

Examples of useful solvents incapable of mixing with water in a free ratio are benzene, toluene, hexane, heptane, xylene, petroleum benzine, petroleum ether, ligroin and like hydrocarbons. These solvents are used in two to five times, preferably about four times, the amount by weight of the starting material, i.e., sodium carboxymethylcellulose.

Examples of useful second solvents miscible with both water and the solvent incapable of mixing with water in a free ratio are alcohols such as methanol, ethanol and isopropanol, ethers such as dioxane and tetrahydrofuran, and acetone. At least two of these solvents can be used in admixture. Methanol, ethanol and like alcohols are especially preferable to use as second solvents.

To effect the ethylation of the invention uniformly, the water content of sodium carboxymethylcellulose is adjusted to a sodium carboxymethylcellulose to water ratio of 75:25 to 50:50, preferably 73:37 to 53:47. The adjustment of the water content (moisture) is conducted by bringing the dry finely divided sodium carboxymethylcellulose into contact with steam. When the material thus conditioned has a water content of less than 75:25 by weight in terms of the sodium carboxymethylcellulose to water ratio, it causes an insufficient ethylation, whereas if it is higher than 50:50, the particles are likely to undergo blocking. The carboxymethylcellulose conditioned with moisture is then thoroughly despersed in a solvent not freely miscible with water and is thereafter ethylated.

Alternatively the starting material is first dispersed in a solvent, such as one already exemplified above, which is incapable of mixing with water in a free ratio. Subsequently a mixture of water and the second solvent is added to the dispersion for the adjustment of the water content. To cause sodium carboxymethylcellulose to absorb water uniformly, it is desired that the second solvent in the mixture have a concentration of not lower than the second solvent to water ratio of 3:7 by weight. The amount of water to be used is so adjusted that the dispersion to be subjected to ethylation will have the sodium carboxymethylcellulose to water ratio specified above. However, when an alcohol is used as the second solvent, the alcohol will participate in the ethylating reaction, affording water, so that the above-mentioned ratio need not always be 75:25 in the initial stage of the reaction. Further when the sodium carboxymethylcellulose used as the starting material has such a low degree of polymerization that the 2% aqueous solution thereof, for example, has a viscosity of 13 centipoises (hereinafter abbreviated as "cps"), the sodium carboxymethylcellulose to water ratio can be 95:5 to 75:25 by weight.

The sodium carboxymethylcellulose thus uniformly swollen with water and made more amenable to reaction is ethylated in the form of a dispersion.

The ethylation of this invention can be conducted in a known manner, for example, with use of an ethyl halide and an alkali. Examples of useful ethyl halides are ethyl chloride and ethyl bromide, of which ethyl chloride is the more preferable. Such an ethyl halide is used in 1.5 to 4 times, preferably 2 to 3 times, the theoretical amount needed to effect the desired degree of ethoxyl substitution. The alkali is used in an amount of 0.7 to 2.0 equivalents, preferably about 1 equivalent, based on the ethyl halide used.

The reaction is carried out at about 100 to about 160° C., preferably at 110° to 150° C., usually in a hermetic system to prevent dissipation of the organic solvent, water and ethyl halide used. It is desirable to effect the reaction in an inert atmosphere, for example, of nitrogen gas. The reaction time, although dependent on the reaction temperature, the kind of ethyl halide used, etc., is at least significantly shorter than is required for the process disclosed in Japanese Patent Publication No. 53-8751.

On completion of the reaction, the solvent is evaporated off, and a mineral acid, such as sulfuric acid, is added to the reaction mixture for the removal of salt. When desired, the product is dissolved in acetic acid or like organic acid and then precipitated with addition of water. Thus the desired ethylcarboxymethylcellulose can be obtained which is 1.5 to 2.5 in degree of ethoxyl substitution.

The desired product, namely ethylcarboxymethylcellulose, should have a degree of ethoxyl substitution of not lower than 1.5; otherwise the product will have reduced solubility in organic solvents. On the other hand, it is practically impossible to obtain products exceeding 2.5 in ethoxyl substitution degree. (Theoretically the total of the carboxymethyl substitution degree and ethoxyl substitution degree is limited to 3.0.)

The ethylcarboxymethylcellulose thus prepared is satisfactory in its resistance to the gastric juice and in its solubility in the intestinal juice. To be rapidly soluble in the intestines, for example within 5 minutes, the product should preferably have a relatively low degree of polymerization. For example, the compound is rapidly soluble in the intestinal juice when a 5 wt. % solution thereof in a mixture of ethanol and water (80:20) has a viscosity of up to 20 cps. An ethylcarboxymethylcellulose having a low polymerization degree and suitable for use as an enteric coating material can be obtained by dissolving the product in acetic acid or like organic solvent, subjecting the solution to hydrolysis with use of sulfuric acid or like mineral acid catalyst to cut the main chain, adding water to the reaction mixture for precipitation, and washing the precipitate with water, followed by drying.

The invention will be described below with reference to examples, to which the invention is not limited. The percentages and ratios in the examples are all by weight unless otherwise indicated.

EXAMPLE 1

A 524 g quantity of finely divided sodium carboxymethylcellulose 0.65 in D.S., having a viscosity of 85 cps when in the form of a 1% aqueous solution, comprising at least 95% of minus 80-mesh particles and containing 29 g of water was dispersed in 2240 g of toluene in an autoclave, and 368 g of a 50% aqueous solution of ethanol was slowly added to the dispersion with stirring. With further stirring, 404 g of flaky sodium hydroxide and then 1005 g of ethyl chloride were added to the mixture. With the air within the autoclave was replaced by nitrogen gas, the resulting mixture was reacted at 120° C. for 6 hours. After cooling the reaction mixture, 225 g of sodium hydroxide was added thereto, the atmosphere in the autoclave replaced by nitrogen gas, and the mixture reacted at 120° C. for 6 hours. After evaporating off the solvent from the reaction mixture, the product was treated with a sufficient quantity of aqueous sulfuric acid solution for acidification, then washed with water and dried, giving ethylcarboxymethylcellulose 2.01 in D.S. of ethoxyl. The product was uniformly soluble in methanol, ethanol, acetone, methyl ethyl ketone, methyl acetate and a mixture of ethanol and water (80:20). The product was 220 cps in the viscosity of 5% solution thereof in ethanol, 52 cps in the viscosity of 5% solution thereof in acetone, 184 cps in the viscosity of 5% solution thereof in ethanol-water (80:20), and 20 in APHA degree showing the yellowness of 5% solution thereof in ethanol-water (80:20). 100 g of ethylcarboxymethylcellulose was further dissolved in 400 g of acetic acid, hydrolyzed with 1.33 g of concentrated sulfuric acid at 65° C. for 50 mins. and purified to obtain a product of lower degree of polymerization, which was also uniformly soluble in methanol, ethanol, acetone, methyl ethyl ketone and methyl acetate. The product was 9.8 cps in the viscosity of 5% solution thereof in ethanol, 4.4 cps in the viscosity of 5% solution thereof in acetone, and 13.7 cps in the viscosity of 5% solution thereof in ethanol-water (80:20). These solutions were spread and then dried to prepare coatings, which were found soluble in McIlvaine's buffer solutions having pH values of at least 5.0.

EXAMPLE 2

The reaction and purification procedures of Example 1 were repeated under the same conditions except that a 50% methanol aqueous solution was used in place of the 50% aqueous solution of ethanol. The ethylcarboxymethylcellulose obtained was 1.96 in D.S. of ethoxyl. The product was uniformly soluble in methanol, ethanol, acetone, methyl ethyl ketone, methyl acetate and a mixture of ethanol and water (80:20), and was 70 in APHA degree showing the yellowness of 5 % solution thereof in ethanol-water (80:20).

EXAMPLE 3

A 507 g quantity of finely divided sodium carboxymethylcellulose 0.57 in D.S., having a viscosity of 153 cps when in the form of a 1% aqueous solution, comprising at least 95% of minus 80-mesh particles and containing 29g of water was dispersed in 2218 g of toluene in an autoclave, and 412 g of a 50% aqueous solution of ethanol was slowly added to the dispersion with stirring. Subsequently 404 g of flaky sodium hydroxide and 1005 g of ethyl chloride were added to the mixture, and the resulting mixture was subjected to reaction and purification under the same conditions as in Example 1, affording ethylcarboxymethylcellulose 1.98 in D.S. of ethoxyl and soluble in methanol, ethanol, acetone, methyl ethyl ketone, methyl acetate and a mixture of ethanol and water (80:20). The product was 385 cps in the viscosity of 5% solution thereof in ethanol, 80 cps in the viscosity of 5% solution thereof in acetone, 286 cps in the viscosity of 5% solution thereof in ethanol-water (80:20), and 40 in APHA degree showing the yellowness of 5% solution thereof in ethanol-water (80:20).

The ethylcarboxymethylcellulose was further dissolved in acetic acid, hydrolyzed with sulfuric acid and purified to obtain a product of lower degree of polymerization, which was also uniformly soluble in methanol, ethanol, acetone, methyl ethyl ketone and methyl acetate. The product was 7.6 cps in the viscosity of 5% solution thereof in ethanol, 3.4 cps in the viscosity of 5% solution thereof in acetone, and 10.5 cps in the viscosity of 5% solution thereof in ethanol-water (80:20). These solutions were spread and then dried to prepare coatings, which were found soluble in McIlvaine's buffer solutions having pH values of at least 5.5.

COMPARISON EXAMPLE 1

A dissolving softwood pulp (2.4 mm in average fiber length) was used. The fibers were loosened without cutting and subject to carboxymethylation with use of isopropanol as a reaction solvent. The product was washed with a mixture of methanol-water (80:20) and dried, giving sodium carboxymethylcellulose 0.58 in D.S. A 144.2 g of the sodium carboxymethylcellulose containing 3.2 g of water was dispersed in 3093 g of toluene in an autoclave, and 111.6 g of 50% aqueous solution of ethanol was slowly added to the dispersion with stirring. Subsequently sodium hydroxide and ethyl chloride were added to the mixture for reaction. The reaction and purification were conducted under the same conditions as in Example 3, using the chemicals in the same proportions as in Example 3 relative to the amount of pure sodium carboxymethylcellulose. The resulting ethylcarboxymethylcellulose, although 1.94 in D.S. of ethoxyl, was not completely soluble in a mixture of ethanol-water (80:20), and the solution was opaque and contained a large amount of gel.

EXAMPLE 4

A 492 g quantity of finely divided sodium carboxymethylcellulose 0.52 in D.S., having a viscosity of 215 cps when in the form of a 1% aqueous solution, comprising at least 95% of minus 80-mesh particles and containing 23 g of water was dispersed in 2216 g of toluene in an autoclave, and 417 g of a 50% aqueous solution of ethanol was slowly added to the dispersion with stirring. Subsequently 404 g of flaky sodium hydroxide and 1005 g of ethyl chloride were added to the mixture, and the resulting mixture was subjected to reaction and purification under the same conditions as in Example 1, affording ethylcarboxymethylcellulose 1.98 in D.S. of ehtoxyl and uniformly soluble in methanol, ethanol, acetone, methyl ethyl ketone, methyl acetate and a mixture of ethanol and water (80:20). The product was 533 cps in the viscosity of 5% solution thereof in ethanol, 108 cps in the viscosity of solution thereof in acetone, 386 cps in the viscosity of 5% solution thereof in ethanol-water (80:20), and 50 in APHA degree showing the yellowness of 5% solution thereof in ethanol-water (80:20).

The ethylcarboxymethylcellulose was further dissolved in acetic acid, hydrolyzed with sulfuric acid and purified to obtain a product of lower degree of polymerization, which was also uniformly soluble in methanol, ethanol, acetone, methyl ethyl ketone, methyl acetate and ethanol-water (80:20). The product was 9.4 cps in the viscosity of 5% solution thereof in ethanol, 4.1 cps in the viscosity of 5% solution thereof in acetone, and 13.2 cps in the viscosity of 5% solution thereof in ethanol-water (80:20). These solutions were spread and then dried to prepare coatings, which were found soluble in McIlvaine's buffer solutions having pH values of at least 5.9.

EXAMPLE 5

A 475 g quantity of finely divided sodium carboxymethylcellulose 0.47 in D.S., having a viscosity of 48.1 cps when in the form of a 1% aqueous solution, comprising at least 95% of minus 80-mesh particles and containing 13 g of water was dispersed in 2239 g of toluene in an autoclave, and 370 g of a 50% aqueous solution of ethanol was slowly added to the dispersion with stirring. With further stirring, 404 g of flaky sodium hydroxide and then 1005 g of ethyl chloride were added to the mixture. With the air within the autoclave replaced by nitrogen gas, the resulting mixture was reacting at 120° C. for 5 hours. After cooling the reaction mixture, 225 g of sodium hydroxide was added thereto, the atmosphere in the autoclave replaced by nitrogen gas, and the mixture reacted at 120° C. for 3 hours. After evaporating off the solvent from the reaction mixture, the product was treated with an aqueous solution of sulfuric acid, and then dissolved in acetic acid. The solution was added to water for precipitation. The precipitate was washed with water and dried.

The ethylcarboxymethylcellulose obtained was 2.07 in D.S. of ethoxyl and was uniformly soluble in methanol, ethanol, acetone, methyl ethyl ketone, methyl acetate and a mixture of ethanol and water (80:20). The product was 92 cps in the viscosity of 5% solution thereof in ethanol, 25 cps in the viscosity of 5% solution thereof in acetone, 102 cps in the viscosity of 5% solution thereof in ethanol-water (80:20), and 50 in APHA degree showing the yellowness of 5% solution thereof in ethanol-water (80:20).

The ethylcarboxymethylcellulose was further dissolved in acetic acid, hydrolyzed with sulfuric acid and purified to obtain a product of lower degree of polymerization, which was also uniformly soluble in methanol, ethanol, acetone, methyl ethyl ketone, methyl acetate and McIlvaine's buffer solutions having pH values of at least 6.2. The product was 7.3 cps in the viscosity of 5% solution thereof in ethanol, 3.2 cps in the viscosity of 5% solution thereof in acetone, and 10.2 cps in the viscosity of 5% solution thereof in ethanol-water (80:20).

EXAMPLE 6

A 540 g quantity of finely divided sodium carboxymethylcellulose 0.73 in D.S., having a viscosity of 85 cps when in the form of a 1% aqueous solution, comprising at least 95% of minus 80-mish particles and containing 30.2 g of water and dispersed in 2236 g of toluene in an autoclave, and 377 g of a 50% aqueous solution of ethanol was slowly added to the dispersion under stirring. With further stirring, 404 g of flaky sodium hydroxide and then 1005 g of ethyl chloride were added to the mixture. With the air within the autoclave replaced by nitrogen gas, the resulting mixture was reacted at 120° C. for 6 hours. After cooling the reaction mixture, 225 g of sodium hydroxide was added thereto, the atmosphere in the autoclave replaced by nitrogen gas, and the mixture reacted at 120° C. for 6 hours. After evaporating off the solvent from the reaction mixture, the product was treated with an aqueous solution of sulfuric acid, and then dissolved in acetic acid. The solution was added to water for precipitation. The precipitate was washed with water and dried.

The ethylcarboxymethylcellulose obtained was 2.04 in D.S. of ethoxyl. The product was uniformly soluble in methanol, ethanol, acetone, methyl ethyl ketone, methyl acetate and a mixture of ethanol and water (80:20). The product was 430 cps in the viscosity of 5% solution thereof in ethanol, 88 cps in the viscosity of 5% solution thereof in acetone, 316 cps in the viscosity of 5% solution thereof in ethanol-water (80:20), and 40 in APHA degree showing the yellowness of 5% solution thereof in ethanol-water (80:20).

The ethylcarboxymethylcellulose was further dissolved in acetic acid, hydrolyzed with sulfuric acid and purified to obtained a product of lower degree of polymerization, which was also uniformly soluble in methanol, ethanol, acetone, methyl ethyl ketone, methyl acetate and McIlvaine's buffer solutions having pH values of at least 4.9. The product was 9.4 cps in the viscosity of 5% solution thereof in ethanol, 4.2 cps in the viscosity of 5% solution thereof in ethanol-water (80:20).

COMPARISON EXAMPLE 2

A 733.5 g quantity of finely divided sodium carboxymethylcellulose 0.73 in D.S., having a viscosity of 85 cps when in the form of a 1% aqueous solution, comprising at least 95% of minus 80-mesh particles and containing 223,7 g of water was dispersed in 2424 g of toluene in an autoclave. With further stirring, 404 g of flaky sodium hydroxide and then 1005 g of ethyl chloride were added to the dispersion. With the air within the autoclave replaced by nitrogen gas, the resulting mixture was reacted at 120° C. for 6 Hours. After cooling the reaction mixture, 225 g of sodium hydroxide was added thereto, the atmosphere in the autoclave replaced by nitrogen gas, and the mixture reacted at 120° C. for 6 hours. After evaporating off the solvent from the reaction mixture, the product was treated with an aqueous solution of sulfuric acid, and then dissolved in acetic acid. The solution was added to water for purification. The precipitate was washed with water and dried.

The ethylcarboxymethylcellulose obtained was 2.10 in D.S. of ethyoxyl. The product was uniformly soluble in methanol, ethanol, acetone, methyl ethyl ketone, methyl acetate and a mixture of ethanol and water (80:20). The product was 200 in the APHA degree of 5% solution thereof in ethanol-water (80:20). This indicates that the product is yellower than the product of Example 6.

EXAMPLE 7

A 505.3 g quantity of finely divided sodium carboxymethylcellulose 0.57 in D.S., having a viscosity of 178 cps when in the form of a 1% aqueous solution, comprising at least 95% of minus 80-mesh particles and containing 27.3 g of water was dispersed in 2216 g of toluene in an autoclave, and 416 g of a 50% aqueous solution of ethanol was rapidly added to the dispersion with stirring. With further stirring, 404 g of flaky sodium hydroxide and then 1005 g of ethyl chloride were added to the mixture. With the air within the autoclave replaced by nitrogen gas, the resulting mixture was reacted at 120° C. for 6 hours. After cooling the reaction mixture, 225 g of sodium hydroxide was added thereto, the atmosphere in the autoclave replaced by nitrogen gas, and the mixture reacted at 120° C. for 6 hours. After evaporating off the solvent from the reaction mixture, the product was treated with an aqueous solution of sulfuric acid, and then dissolved in acetic acid. The solution was added to water for precipitation. The precipitate was washed with water and dried, giving ethylcarboxymethylcellulose 2.11 in D.S. of ethoxyl. The product was uniformly soluble in methanol, ethanol, acetone, methyl ethyl ketone, methyl acetate and a mixture of ethanol and water (80:20). The product was 92 cps in the viscosity of 5% solution thereof in ethanol, 24 cps in the viscosity of 5% solution thereof in acetone, 102 cps in the viscosity of 5% solution thereof in ethanol-water (80:20), and 80 in APHA degree showing the yellowness of 5% solution thereof in ethanol-water (80:20).

The ethylcarboxymethylcellulose was further dissolved in acetic acid, hydrolyzed with sulfuric acid and purified to obtain a product of lower degree of polymerization, which was also uniformly soluble in methanol, ehtanol, acetone, methyl ethyl ketone and methyl acetate. The product was 10 cps in the viscosity of 5% solution thereof in ethanol, 4.5 cps in the viscosity of 5% solution thereof in acetone, and 14.0 cps in the viscosity of 5% solution thereof in ethanol-water (80:20).

COMPARISON EXAMPLE 3

As 505.3 g quantity of finely divided sodium carboxymethylcellulose 0.57 in D.S., having a viscosity of 178 cps when in the form of a 1% aqueous solution, comprising at least 95% of minus 80-mesh particles and containing 27.3 g of water was dispersed in 2216 g of toluene in an autoclave, and 208 g of ethanol was added to the dispersion with stirring, followed by slow addition of 208 g water. With further stirring, 404 g of flaky sodium hydroxide and then 1005 g of ethyl chloride were added to the mixture. With the air within the autoclave replaced by nitrogen gas, the resulting mixture was reacted at 120° C. for 6 hours. After cooling the reaction mixture, 225 g of sodium hydroxide was added thereto, the atmosphere in the autoclave replaced by nitrogen gas, and the mixture reacted at 120° C. for 6 hours. After evaporating off the solvent from the reaction mixture, the product was treated with an aqueous solution of sulfuric acid, and then dissolved in acetic acid. The solution was added to water for precipitation. The precipitate was washed with water and dried, giving ethylcarboxymethylcellulose 2.21 in D.S. of ethoxyl. The product was not uniformly soluble in methanol, ethanol, acetone, methyl ethyl ketone, methyl acetate and a mixture of ethanol and water (80:20), and the resulting mixtures were opaque and contained a large amount of gel.

The ethylcarboxymethylcellulose was further dissolved in acetic acid, hydrolyzed with sulfuric acid and purified to obtain a product of lower degree of polymerization, which was not fully soluble in the above-mentioned solvents, failing to give transparent solutions.

EXAMPLE 8

Finely divided sodium carboxymethylcellulose 0.65 in D.S., having a viscosity of 85 cps when in the form of a 1% aqueous solution and comprising at least 95% of minus 80-mesh particles was conditioned to a sodium carboxymethylcellulose to water ratio of 68.7:31.3. A 722 g of quantity of the conditioned cellulose (containing 226 g of water) was dispersed in 2424 g of toluene. With stirring, 404 g of flaky sodium hydroxide and then 1005 g of ethyl chloride were added to the dispersion. With the air within the autoclave replaced by nitrogen gas, the resulting mixture was reacted at 120° C. for 6 hours. After cooling the reaction mixture, 225 g of flaky sodium hydroxide was added thereto, the atmosphere in the autoclave replaced by nitrogen gas, and the mixture reacted at 120° C. for 6 hours. After evaporating off the solvent from the reaction mixture, the product was treated with a quantity of aqueous sulfuric acid solution sufficient to acidify the carboxymethyl, then washed with water and dried, giving ethylcarboxymethylcellulose 2.04 in D.S. of ethoxyl. The product was uniformly soluble in methanol, ethanol, acetone, methyl ethyl ketone, methyl acetate and a mixture of ethanol and water (80:20). The product was 70 cps in the viscosity of 5% solution thereof in ethanol, 19 cps in the viscosity of 5% solution thereof in acetone, 83 cps in the viscosity of 5% solution thereof in ethanol-water (80:20).

The ethylcarboxymethylcellulose was further dissolved in acetic acid, hydrolyzed with sulfuric acid and purified to obtain an ethylcarboxymethylcellulose of lower degree of polymerization, which was also uniformly soluble in the above-mentioned solvents. The product was 7.8 cps in the viscosity of 5% solution thereof in ethanol, 3.5 cps in the viscosity of 5% solution thereof in acetone, and 10.8 cps in the viscosity of 5% solution thereof in ethanol-water (80:20). These solutions were spread and then dried to prepare coatings, which were found soluble in McIlvaine's buffer solutions having pH values of at least 5.0.

EXAMPLE 9–12

Ethylcarboxymethylcelluloses were prepared exactly under the same conditions as in Example 8 with the exception of varying the sodium carboxymethylcellulose to water ratio to which the starting material was conditioned, to alter only the amount of water to be introduced into the reaction system. The desired products obtained on purification were found to have good solubility in solvents. The altered reaction conditions and results are given in Table 1.

TABLE 1

| Example | 9 | 10 | 8 | 11 | 12 |
|---|---|---|---|---|---|
| NaCMC*: water | 74.5:25.5 | 72.0:28.0 | 68.7:31.3 | 64.8:35.2 | 54:46 |
| Water: NaOH in initial stage of | 29.6:70.4 | 32.3:67.7 | 36:64 | 40.1:59.9 | 51.1:48.9 |

TABLE 1-continued

| Example | 9 | 10 | 8 | 11 | 12 |
|---|---|---|---|---|---|
| ethylation | | | | | |
| Solubility of product in Ethanol-water (8:2) | Slightly opaque soln. with gel | Transparent | Transparent | Transparent | Transparent |
| D.S. of ethyl of product | 2.02 | 2.03 | 2.04 | 1.96 | 1.90 |

*NaCMC stands for sodium carboxymethylcellulose.

COMPARISON EXAMPLES 4–7

Ethylcarboxymethylcelluloses were prepared exactly under the same conditions as in Examples 8 to 12 with the only exception of varying the sodium carboxymethylcellulose to water ratio to which the starting material was conditioned, as listed in Table 2, which also shows the results. The products had poor solubility in solvents.

TABLE 2

| Comparison Example | 4 | 5 | 6 | 7 |
|---|---|---|---|---|
| NaCMC*: water | 93.3:6.7 | 81.1:18.9 | 80:20 | 76.7:23.3 |
| Water:NaOH in initial stage of ethylation | 8.4:91.6 | 22.2:77.8 | 23.5:76.5 | 27.2:72.8 |
| Solubility of product in Ethanol-water (8:2) | Insoluble | Opaque soln. with marked gelation | Opaque soln. with marked gelation | Opaque soln. with marked gelation |
| D.S. of ethyl of product | Difficult to purify, uneven degree | Difficult to purify, uneven degree | Difficult to purify uneven degree | Difficult to purify uneven degree |

*NaCMC stands for sodium carboxymethylcellulose.

With respect only to the water to NaOH ratio in the initial stage of ethylation, Examples 8 to 11 and Comparison Examples 5 to 7 are within the range discloses in Japanese Patent Publication No. 53-8751, while Example 12 is outside thereof.

EXAMPLE 13

Finely divided sodium carboxymethylcellulose 0.52 in D.S., having a viscosity of 215 cps when in the form of a 1% aqueous solution and comprising at least 95% of minus 80-mesh particles was conditioned to a sodium carboxymethylcellulose to water ratio of 68.9:31.1. A 684 g quantity of the conditioned cellulose (containing 213 g of water) was dispersed in 2424 g of toluene. With stirring, 404 g of flaky sodium hydroxide and then 1005 g of ethyl chloride were added to the dispersion. With the air within the autoclave replaced by nitrogen gas, the resulting mixture was reacted at 120° C. for 6 hours. After cooling the reaction mixture, 225 g of flaky sodium hydroxide was added thereto, the atmosphere in the autoclave replaced by nitrogen gas, and the mixture reacted at 120° C. for 6 hours. After evaporating off the solvent from the reaction mixture, the product was treated with a quantity of aqueous sulfuric acid solution sufficient to acidify the carboxymethyl, then washed with water and dried, giving ethylcarboxymethylcellulose 2.09 in D.S. of ethoxyl. The product was uniformly soluble in methanol, ethanol, acetone, methyl ethyl ketone, methyl acetate and a mixture of ethanol and water (8:2). The product was 36 cps in the viscosity of 5% solution thereof in ethanol, 10 cps in the viscosity of 5% solution thereof in acetone, 46 cps in the viscosity of 5% solution thereof in ethanol-water (8:2).

The ethylcarboxymethylcellulose was further dissolved in acetic acid, hydrolyzed with sulfuric acid and purified to obtain an ethylcarboxymethylcellulose of lower degree of polymerization, which was also uniformly soluble in the above-mentioned solvents. The product was 10.3 cps in the viscosity of 5% solution thereof in ethanol, 4.5 cps in the viscosity of 5% solution thereof in acetone, and 14.3 cps in the viscosity of 5% solution thereof in ethanol-water (8:2). These solutions were spread and then dried to prepare coatings, which were found soluble in McIlvaine's buffer solutions having pH values of at least 5.9.

EXAMPLE 14

Finely divided sodium carboxymethylcellulose 0.57 in D.S., having a viscosity of 153 cps when in the form of a 1% aqueous solution and comprising at least 95% of minus 80-mesh particles was conditioned to a sodium carboxymethylcellulose to water ratio of 67.8:32.2. A 708 g quantity of the conditioned cellulose (containing 228 g of water) was dispersed in 2424 g of toluene. With stirring, 404 g of flaky sodium hydroxide and then 1005 g of ethyl chloride were added to the dispersion. With the air within the autoclave replaced by nitrogen gas, the resulting mixture was reacted at 120° C. for 6 hours. After cooling the reaction mixture, 225 g of flaky sodium hydroxide was added thereto, the atmosphere in the autoclave replaced by nitrogen gas, and the mixture reacted at 120° C. for 6 hours. After evaporating off the solvent from the reaction mixture, the product was treated with a quantity of aqueous sulfuric acid solution sufficient to acidify the carboxymethyl, then washed with water and dried, giving ethylcarboxymethylcellulose 2.09 in D.S. of ethoxyl. The product was uniformly soluble in methanol, ethanol, acetone, methyl ethyl ketone, methyl acetate and a mixture of a ethanol and water (8:2). The product was 52 cps in the viscosity of 5% solution thereof in ethanol, 12 cps in the viscosity of 5% solution thereof in acetone, 63 cps in the viscosity of 5% solution thereof in ethanol-water (8:2).

The ethylcarboxymethylcellulose was further dissolved in acetic acid, hydrolyzed with sulfuric acid and purified to obtained an ethylcarboxymethylcellulose of lower degree of polymerization, which was also uniformly soluble in the above-mentioned solvents. The product was 9.5 cps in the viscosity of 5% solution thereof in ethanol, 4.2 cps in the viscosity of 5% solution thereof in acetone, and 13.3 cps in the viscosity of 5% solution thereof in ethanol-water (8:2). These solutions were spread and then dried to prepare coatings, which were found soluble in McIlvaine's buffer solutions having pH values of at least 5.5.

COMPARISON EXAMPLE 8

A dissolving softwood pulp (2.4 mm in average fiber length) was used. The fibers were loosened without cutting and subjected to carboxymethylation with use of isopropanol as a reaction solvent. The product was washed with a mixture of methanol-water (80:20) and dried, giving sodium carboxymethylcellulose 0.58 in D.S. The cellulose was conditioned to a sodium carboxymethylcellulose to water ratio of 66.9:33.1. A 209.3 g. quantity of the conditioned cellulose (containing 69.3 g of water) was dispersed in 313 g of toluene. The dispersion was thereafter reacted under the same conditions as in Example 14, using the chemicals in the same proportions relative to the amount of pure sodium carboxymethylcellulose, with the exception of using an excess of toluene for uniform stirring. The reaction mixture was purified to give ethylcarboxymethylcellulose, which was not completely soluble in ethanol-water (80:20), and the solution was opaque and contained a large amount of gel. The product was 1.71 in D.S. of ethoxyl.

EXAMPLE 15

Finely divided sodium carboxymethylcellulose 0.47 in D.S., having a viscosity of 48 cps when in the form of a 1% aqueous solution and comprising at least 95% of minus 80-mesh particles was conditioned to a sodium carboxymethylcellulose to water ratio of 70:30. A 660 g quantity of the conditioned cellulose (containing 198 g of water) was dispersed in 2424 g of toluene. With stirring, 404 g of flaky sodium hydroxide and then 1005 g of ethyl chloride were added to the dispersion. With the air within the autoclave replaced by nitrogen gas, the resulting mixture was reacted at 120° C. for 5 hours. After cooling the reaction mixture, 225 g of flaky sodium hydroxide was added thereto, the atmosphere in the autoclave replaced by nitrogen gas, and the mixture reacted at 120° C. for 3 hours. After evaporating off the solvent from the reaction mixture, the product was treated with an aqueous solution of sulfuric acid, and then dissolved in acetic acid. The solution was added to water for precipitation. The precipitate was washed with water and dried, giving ethylcarboxymethylcellulose 2.15 in D.S. of ethoxyl. The product was completely soluble in methanol, ethanol, acetone methyl ethyl ketone, methyl acetate and a mixture of ethanol and water (80:20). The product was 34 cps in the viscosity of 5% solution thereof in ethanol, 8 cps in the viscosity of 5% solution thereof in acetone, 43 cps in the viscosity of 5% solution thereof in ethanol-water (80:20).

The ethylcarboxymethylcellulose was further dissolved in acetic acid, hydrolyzed with sulfuric acid and purified to obtain an ethylcarboxymethylcellulose of lower degree of polymerization, which was also uniformly soluble in the above-mentioned solvent, and was further soluble in McIlvain's buffer solutions having pH values of at least 6.2.

The product was 7.5 cps in the viscosity of 5% solution thereof in ethanol, 3.3 cps in the viscosity of 5% solution thereof in acetone, and 10.4 cps in the viscosity of 5% solution thereof in ethanol-water (80:20).

EXAMPLE 16

Finely divided sodium carboxymethylcellulose 0.73 in D.S., having a viscosity of 85 cps when in the form of a 1% aqueous solution and comprising at least 95% of minus 80-mesh particles was conditioned to a sodium carboxymethylcellulose to water ratio of 69.5:30.5. A 733.5 g quantity of the conditioned cellulose (containing 223.7 g of water) was dispersed in 2424 g of toluene. With stirring, 404 g of flaky sodium hydroxide and then 1005 g of ethyl chloride were added to the dispersion. With the air within the autoclave replaced by nitrogen gas, the resulting mixture was reacted at 120° C. for 6 hours. After cooling the reaction mixture, 225 g of flaky sodium hydroxide was added thereto, the atmosphere in the autoclave replaced by nitrogen gas, and the mixture reacted at 120° C. for 6 hours. After evaporating off the solvent from the reaction mixture, the product was treated with an aqueous solution of sulfuric acid, washed with water and then dissolved in acetic acid. The product was precipitated from water and then dried.

The purified ethylcarboxymethylcellulose was 2.10 in D.S. of ethoxyl. The product was uniformly soluble in methanol, ethanol, acetone, methyl ethyl ketone, methyl acetate and a mixture of ethanol and water (80:20). The product was 116 cps in the viscosity of 5% solution thereof in ethanol, 30 cps in the viscosity of 5% solution thereof in acetone, 120 cps in the viscosity of 5% solution thereof in ethanol-water (80:20).

The product was further dissolved in acetic acid, hydrolyzed with sulfuric acid and purified to obtain an ethylcarboxymethylcellulose of lower degree of polymerization, which was soluble in the above-mentioned solvents, and was further soluble in McIlvaine's buffer solutions having pH values of at least 4.9. The product was 9.6 cps in the viscosity of 5% solution thereof in ethanol, 4.2 cps in the viscosity of 5% solution thereof in acetone, and 13.2 cps in the viscosity of 5% solution thereof in ethanol-water (80:20).

What is claimed is:

1. A process for preparing ethylcarboxymethylcellulose 0.4 to 1.2 in degree of carboxymethyl substitution and 1.5 to 2.5 in degree of ethoxyl substitution and having good solubility in organic solvents from powdery sodium carboxymethylcellulose 0.4 to 1.2 in degree of carboxymethyl substitution, comprising:
   (a) finely dividing the sodium carboxymethylcellulose to an extent that at least 90 wt. % of the resulting particles pass through a 40-mesh screen,
   (b) (i) dispersing the finely divided sodium carboxymethyl cellulose in a solvent incapable of mixing with water in a free ratio and subsequently adding to the dispersion a mixture of water and a second solvent miscible with both water and the solvent incapable of mixing with water in a free ratio to adjust the sodium carboxymethylcellulose to water ratio of the dispersion to 75:25 to 50:50 by weight, or (ii) adjusting the water content of the finely divided cellulose to a sodium carboxymethylcellulose to water ratio of 75:25 to 50:50 by weight and dispersing the resulting cellulose in a solvent incapable of mixing with water in a free ratio, and
   (c) subjecting the dispersion to ethylation.

2. A process as claimed in claim 1 wherein the solvent incapable of mixing with water in a free ratio is benzene, toluene, hexane, xylene or heptane.

3. A process as claimed in claim 1 wherein the second solvent is methanol, ethanol, isopropanol, dioxane, tetrahydrofuran or acetone.

4. A process as claimed in claim 1 wherein the second solvent in the mixture has a concentration of not lower than the second solvent to water ratio of 3:7 by weight.

5. A process as claimed in claim 1 wherein the resulting ethylcarboxymethylcellulose is further hydrolyzed with sulfuric acid and purified.

* * * * *